United States Patent Office 3,801,639
Patented Apr. 2, 1974

---

3,801,639
CATALYTIC HYDRATION OF ACRYLONITRILE TO ACRYLAMIDE
Anthony Joseph Fanelli, Stamford, Gerlinde Metzler Blank, Wilton, and Francis Clyde Rauch, Stamford, Conn., assignors to American Cyanamid Company, Stamford, Conn.
No Drawing. Filed June 2, 1972, Ser. No. 259,173
Int. Cl. C07c 103/08
U.S. Cl. 260—561 N    14 Claims

ABSTRACT OF THE DISCLOSURE

A homogeneous catalyst system consisting of a transition metal compound and a diaryl or dialkyl phosphine oxide is used in solution with water and a selected nitrile for hydration of the nitrile to make a corresponding amide. In a preferred embodiment acrylonitrile is hydrated with water in presence of rhodium trichloride and diphenyl phosphine oxide or diethyl phosphine oxide to make acrylamide.

---

Reference is made to the copending application Ser. No. 94,196, filed Dec. 1, 1970 by F. C. Rauch and G. W. Nachtigall, now U.S. Pat. No. 3,673,250, patented June 27, 1972. The entire specification of that application is incorporated herein by reference.

The invention relates to catalytic hydration of a nitrile with water to produce the corresponding amide, such as acrylamide from acrylonitrile. In the copending application, mentioned above, there is described the hydration of a selected nitrile in a liquid solution which also comprises water and a homogeneous catalyst which comprises an organic phosphine, organic phosphite, or the like and a transition metal compound such as rhodium trichloride or the like. The most preferred specific catalyst combination of the generic class previously described had been a triaryl or trialkyl phosphine, e.g. triphenylphosphine, triethylphosphine, etc. with a rhodium compound e.g. rhodium trichloride, etc. Such embodiments were described in several examples of the same copending application.

Also described in the aforesaid application Ser. No. 94,196, filed Dec. 1, 1970, were embodiments of the invention wherein, in addition to the selected transition metal compound and the selected organic phosphine or organic phosphite there was also present in the catalyst system an organic phosphine oxide which improved catalytic activity. In an embodiment described in the earlier application, for example, it was found that an effective combination for such improved catalytic activity comprised, in combination, rhodium trichloride, triphenylphosphine and triphenylphosphine oxide. Now we have found that diaryl phosphine oxides and dialkyl phosphine oxides can be used with a transition metal compound in a catalyst system without need for the presence of an organic phosphine or phosphite in the catalyst system. This independent catalytic activity of a catalyst system with a diaryl or dialkyl phosphine oxides, and without the presence of an organic phosphine or phosphite, was not obtained with the triaryl and trialkyl phosphine oxides.

The usual yield of amide per hour per mole of transition metal in the system is found to be considerably higher in a nitrile hydration process using a dialkyl or diaryl phosphine oxide than the usual yields obtained in a process using the organic phosphites or phosphines that we have actually used. This is a very important economic advantage because some of the transition metals, and particularly rhodium which is the most preferred, are scarce and very expensive.

Reference is made to the earlier copending application Ser. No. 94,196 for more detailed description of typical yields per hour per mole of rhodium in several systems employing trialkyl and triaryl phosphines and phosphites. The highest yield per hour per mole of rhodium described in the copending application was 7.5 moles/hr./mole catalyst, obtained with trialkyl and triaryl phosphites.

Also, reference is made to the same earlier copending application for more detailed description of the class of transition metal compounds that are capable of forming a coordination complex with the phosphine oxide components, and particularly of rhodium compounds that can be used as catalyst components. The earlier copending application also describes in more detail the broad class of organic nitriles that can be hydrated by the process of the invention. Those descriptions apply the same with regard to the present invention.

Any suitable diaryl or dialkyl phosphine oxide that can be solubilized with the other components of the reaction solution can be used. Diaryl phosphine oxides that can be used include diphenyl, ditolyl, dichlorophenyl, dibromophenyl, dianisyl, di(3,5-ditrifluoromethylphenyl) phosphine oxides and the like. Dialkyl phosphine oxides that can be used include diethyl, dibutyl, dimethyl, diisopropyl, di-n-octadecyl, dibenzyl phosphine oxides and the like.

EXAMPLE 1

A solution was prepared using 0.2 millimole (mmole) $Rh(AN)_3Cl_3$ complex, 0.4 mmole diphenyl phosphine oxide (molar ratio 2 phosphine oxide:1 Rh), 0.2 mmole 2,5-dinitrophenol as polymerization inhibitor, and 0.15 ml. (8.3 mmoles) water in 10.0 ml. (152 mmoles) acrylonitrile.

The $Rh(AN)_3Cl_3$ complex is a complex of acrylonitrile (AN) and rhodium trichloride ($RhCl_3$). The complex had been previously prepared by dissolution of $RhCl_3$ hydrate in acrylonitrile followed by precipitation of the $Rh(AN)_3Cl_3$ complex with diethyl ether. The yellow solid thus formed was filtered, dried by air suction for one hour hour and vacuum pumping for one hour. The 2,5-dinitrophenol was incorporated to prevent polymerization reaction of the acrylonitrile or the acrylamide formed.

The reaction solution was heated for a reaction period of 38.8 hours at 70°±0.3° C. During this period of 0.6 ml., 33 mmoles additional water was added in 0.2 ml. increments as needed. During the initial 25 hours of reaction the rate of acrylamide (AMD) formation steadily increased, reaching a value of 2.0 moles per liter-hour (100 moles AMD/mole Ph/hr.) Acrylamide formation proceeded at this rate for several additional hours when the reaction was terminated by quenching at 25° C. Acrylamide product was recovered at near 100% yield.

EXAMPLE 2

A reaction solution was prepared as in Example 1 except that 0.2 mmole of diethyl chlorphosphine was substituted for the 0.4 mmole of diphenyl phosphine oxide. In the presence of water diethyl chlorophosphine is immediately hydrolyzed to diethyl phosphine oxide. The induction period was about 25 hours. At the end of which the rate had reached a maximum of about .09 mole/liter/hour (4.5 moles AMD/mole Rh/hr.). This example illustrates the use of a precursor to provide the disubstituted phosphine oxide catalyst component in the solution. Compounds hydrolyzable to dialkyl or diaryl phosphine oxides, e.g.

can be used. In fact, using diphenyl chlorophosphine, which immediately hydrolyzes to diphenyl phosphine

EXAMPLE 3

A reaction solution was prepared as in Example 1 except that 0.4 mmole of di(p-chlorophenyl) phosphine oxide was substituted for 0.4 mmole of diphenyl phosphine oxide. The reaction proceeded without significant induction period at a rate of 0.7 mole/liter/hour (35 moles AMD/mole Rh/hr.) for about 5 hours when the reaction was terminated. The yield of acrylamide was essentially quantitative.

EXAMPLE 4

The procedure of Example 1 was followed except that 0.4 mmole of di(3,5-ditrifluoromethylphenyl) phosphine oxide was substituted for diphenyl phosphine oxide. The reaction proceeded without significant induction period at a rate of 0.72 mole/liter/hour (36 moles AMD/mole Rh/hr.) for 6 hours, until terminated by quenching. The yield of acrylamide was nearly 100%.

EXAMPLE 5

The procedure of Example 1 was followed except that 0.4 mmole of di(p-tolyl) phosphine oxide was substituted for diphenyl phosphine oxide. The reaction proceeded after an induction period of about 18 hours at a rate of 1.2 moles/liter/hour (60 moles acrylamide/mole Rh/hr.).

EXAMPLE 6

The procedure of Example 1 was followed except that 0.4 mmole of di(p-anisyl) phosphine oxide was substitued for diphenyl oxide. The results were essentially equivalent to those in Example 5.

EXAMPLE 7

The procedure of Example 1 was followed except that di(p-bromophenyl) phosphine oxide was substituted for diphenyl phosphine oxide. After an induction period of about 10 hours the rate was 1.5 moles/liter/hr. (75 moles AMD/mole Rh/hr.).

We claim:
1. A process for producing acrylamide by catalytic hydration of acrylonitrile which comprises reacting water and the selected nitrile in liquid solution with a homogeneous catalyst which consists essentially of a dialkyl or diaryl phosphine oxide and a rhodium compound capable of forming a coordination complex with said dialkyl or diaryl phosphine oxide.
2. A process defined by claim 1 wherein the rhodium compound is rhodium trichloride.
3. A process defined by claim 1 wherein the selected phosphine oxide is diphenyl phosphine oxide.
4. A process defined by claim 2 wherein the selected phosphine oxide is diphenyl phosphine oxide.
5. A process defined by claim 1 wherein the selected phosphine oxide is di(p-chlorophenyl) phosphine oxide.
6. A process defined by claim 2 wherein the selected phosphine oxide is di(p-chlorophenyl) phosphine oxide.
7. A process defined by claim 1 wherein the selected phosphine oxide is di(p-bromophenyl) phosphine oxide.
8. A process defined by claim 2 wherein the selected phosphine oxide is di(p-bromophenyl) phosphine oxide.
9. A process defined by claim 1 wherein the selected phosphine oxide is di(p-anisylphenyl) phosphine oxide.
10. A process defined by claim 2 wherein the selected phosphine oxide is di(p-anisylphenyl) phosphine oxide.
11. A process defined by claim 1 wherein the selected phosphine oxide is di(p-tolyl) phosphine oxide.
12. A process defined by claim 2 wherein the selected phosphine oxide is di(p-tolyl) phosphine oxide.
13. A process defined by claim 1 wherein the selected phosphine oxide is di(3,5-ditrichlorophenyl) phosphine oxide.
14. A process defined by claim 2 wherein the selected phosphine oxide is di(3,5-ditrichlorophenyl) phosphine oxide.

References Cited
UNITED STATES PATENTS
3,673,250   6/1972   Rauch et al. _____ 260—561 N LEWIS GOTTS, Primary Examiner E. G. LOVE, Assistant Examiner